United States Patent
Van Eijndhoven et al.

[19]

[11] Patent Number: 6,076,154
[45] Date of Patent: Jun. 13, 2000

[54] VLIW PROCESSOR HAS DIFFERENT FUNCTIONAL UNITS OPERATING ON COMMANDS OF DIFFERENT WIDTHS

[75] Inventors: Jos T. Van Eijndhoven; Gerrit A. Slavenburg, both of Los Altos; Selliah Rathnam, Fremont, all of Calif.

[73] Assignee: U.S. Philips Corporation, New York, N.Y.

[21] Appl. No.: 09/008,339

[22] Filed: Jan. 16, 1998

[51] Int. Cl.[7] .................................................. G06F 15/00
[52] U.S. Cl. .......................... 712/24; 712/206; 712/215; 712/244
[58] Field of Search ................ 395/800.24, 709, 395/705, 706, 390, 391, 376, 384, 582; 712/244, 206, 24, 215

[56] References Cited

U.S. PATENT DOCUMENTS

| | | | |
|---|---|---|---|
| 5,442,762 | 8/1995 | Kato et al. ................................. | 395/384 |
| 5,450,556 | 9/1995 | Slavenburg et al. ....................... | 395/582 |
| 5,475,824 | 12/1995 | Grochowski et al. ................... | 712/206 |
| 5,530,817 | 6/1996 | Masubuchi ........................... | 395/800.24 |
| 5,600,810 | 2/1997 | Ohkami ................................... | 395/567 |
| 5,680,637 | 10/1997 | Hotta et al. ......................... | 395/800.24 |
| 5,692,169 | 11/1997 | Kathail et al. .......................... | 712/244 |
| 5,724,535 | 3/1998 | Woudsma et al. ...................... | 395/391 |
| 5,761,470 | 6/1998 | Yoshida .................................. | 395/386 |
| 5,787,302 | 7/1998 | Hampapuram et al. ............. | 395/800.24 |

OTHER PUBLICATIONS

Aarts et al., "programming VLIW architectures with super operations", SPIE, vol. 3311, 1998, pp. 79–87, Jan. 1998.

*Primary Examiner*—Meng-Ai T. An
*Assistant Examiner*—Nabil El-Hady

[57] ABSTRACT

A VLIW processor has first and second functional units for executing first and second commands in a first instruction word. The first and second commands comprise a first field and a second field, respectively, in ordered concatenations of fields. The processor has a third functional unit for executing a third command in a second instruction word. The third command comprises both the first and second fields.

2 Claims, 3 Drawing Sheets

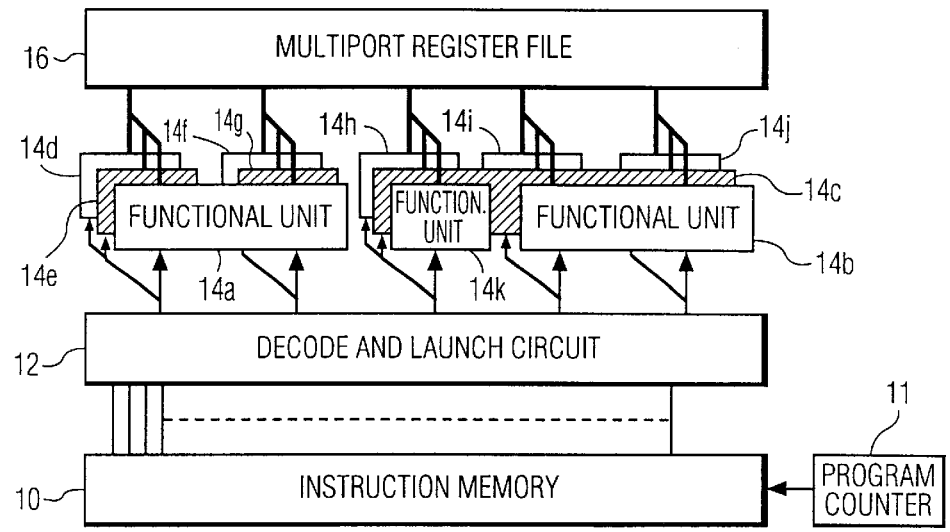
FIG. 1
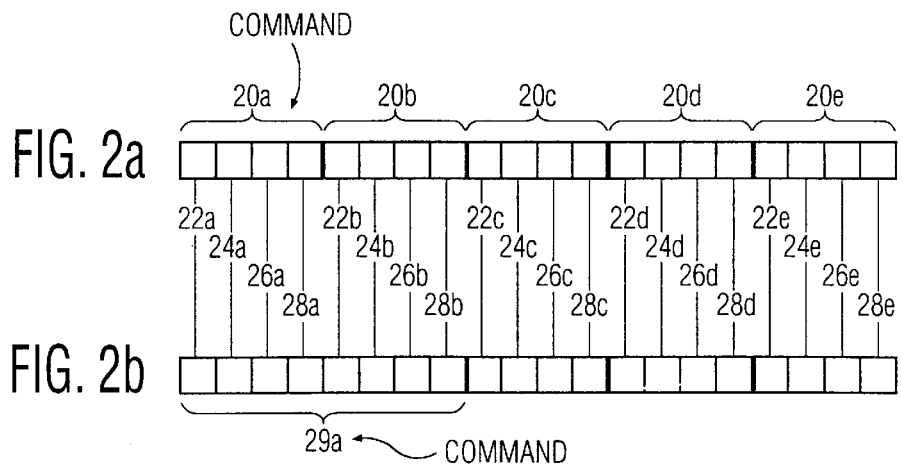
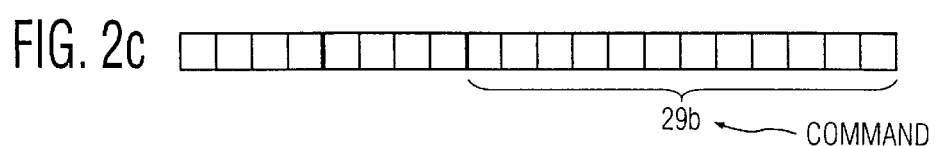

VLIW PROCESSOR HAS DIFFERENT FUNCTIONAL UNITS OPERATING ON COMMANDS OF DIFFERENT WIDTHS

FIELD OF THE INVENTION

The invention relates to a VLIW (Very Large Instruction Word) processor. The invention also relates to a program for such a processor and to compilation of such a program.

BACKGROUND ART

An example of a VLIW processor is the TM-1000 processor (TriMedia) of Philips Electronics. This processor is described in, for example, European patent application No. EP 605 927 (equivalent to U.S. Ser. No. 07/999,080 now abandoned; PHA 21777). In a VLIW processor, parallel execution of instructions is obtained by combining multiple basic machine commands in a single long instruction word. Typically, each such basic command represents a RISC operation. Per clock cycle, a long instruction word is supplied to a parallel arrangement of functional units that operate in lock-step. A respective one of the commands is supplied to a relevant one of the units. Typically, a unit performs pipelined execution.

The TM-1000 processor issues the commands in parallel, each in a respective issue slot of the very long instruction word issue register. Each issue slot is associated with a respective group of functional units and with two read ports and one write port to the register file. A particular command is directed to a specific one among the functional units of the group that is associated with the particular issue slot. The command typically comprises an opcode, two source operand definitions and a result operand definition. The source operand definitions and the result operand definition refer to registers in the register file. During execution of the command, the source operands are read from the particular issue slot by supplying fetch signals to the read ports associated with the issue slot in order to fetch the operands. Typically, the functional unit receives the operands from these read ports, executes the command according to the opcode and writes back a result into the register file via the write port associated with the particular issue slot. Alternatively, commands may use fewer than two operands and/or produce no result for the register file.

A typical program for the VLIW processor is translated into a set of commands for the functional units. A compile time scheduler distributes these commands over the long instruction words. The scheduler attempts to minimize the time needed to execute the program by optimizing parallelism. The scheduler combines commands into instruction words under the constraint that the commands assigned to the same instruction can be executed in parallel and under data dependency constraints.

SUMMARY OF THE INVENTION

It is one of the objects of the invention to provide a VLIW processor whose architecture enables reducing the number of instruction words required for execution of a program with respect to conventional VLIW processors.

To this end, the VLIW processor of the invention comprises an instruction issue port for sequentially supplying first and second very long instruction words. Each respective one of the words comprises a respective ordered concatenation of fields distributed among a respective concatenation of commands. The first word comprises a first one of the commands having a first one of the fields, and a second one of the commands having a second one of the fields. The second word comprises a third one of the commands having the first and second ones of the fields. The processor has a first functional unit coupled to the issue port for processing the first command, and a second functional unit coupled to the issue port for processing the second command in lock-step with the first unit. The processor also has a third functional unit coupled to the issue port for processing the third command.

The invention is based on a flexible division of the instruction issue port into issue slots. This means that is possible, for example, to use different commands that use different numbers of fields for operands. Also, different commands may have opcodes of different sizes. Fields that are associated with specialized resources of the circuitry processing the commands, here the functional units, can be used in combination with functional units from different groups, associated with different issue slots. This allows the use of more complex commands than with in instruction issue port divided into fixed issue slots. There is no need to reserve more space in the issue slots for handling the most complex command. In a conventional VLIW processor, such complex commands have to be implemented using several less complex commands in a sequence of multiple instruction words. Accordingly, the invention enables execution of programs faster than is possible with a conventional VLIW processor, because completion of the program requires fewer instruction words.

For example, in a machine such as the TM-1000, an operation which computes a result from three operands (for example, an averaging operation) would require at least two successively executed commands and therefore at least two instructions. By providing for a command with fields for more than two operands, the operation can be executed using one command. Moreover, because the fields are assigned flexibly to commands, this can be realized without reserving more than two fields for operands for all commands. In an embodiment of the invention, the third command contains all the fields used for execution of the first and second commands. So, for example, if first and second fixed size issue slots are used to issue the first and second command respectively, the third command may use a combination of the first and second issue slots. This simplifies scheduling.

Different fields in each command, i.e., in each issue slot, may each have a fixed functionality, such as representing a read address of an operand register, or representing a write address of a result register or representing an opcode. These different fields will be associated with fixed parts of the instruction processing circuits, like read ports or opcode decoders. In this case, the third instruction can use twice the number of operands and/or produce twice the number of results and/or use a double size opcode. When a respective one of the issue slots is associated with a respective group of functional units, a functional unit that executes the third command belongs to both groups at the same time.

The invention also relates to a compiler for compiling programs for a VLIW processor with flexible assignments of fields to instructions and to programs having such a flexible assignment.

BRIEF DESCRIPTION OF THE DRAWING

These and other aspects of the invention are illustrated by way of example in the accompanying drawing, wherein:

FIG. 1 is a block diagram of a VLIW processor according to the invention;

FIGS. 2a–c are diagrams of instruction word formats;

PREFERRED EMBODIMENTS

Figure 3:
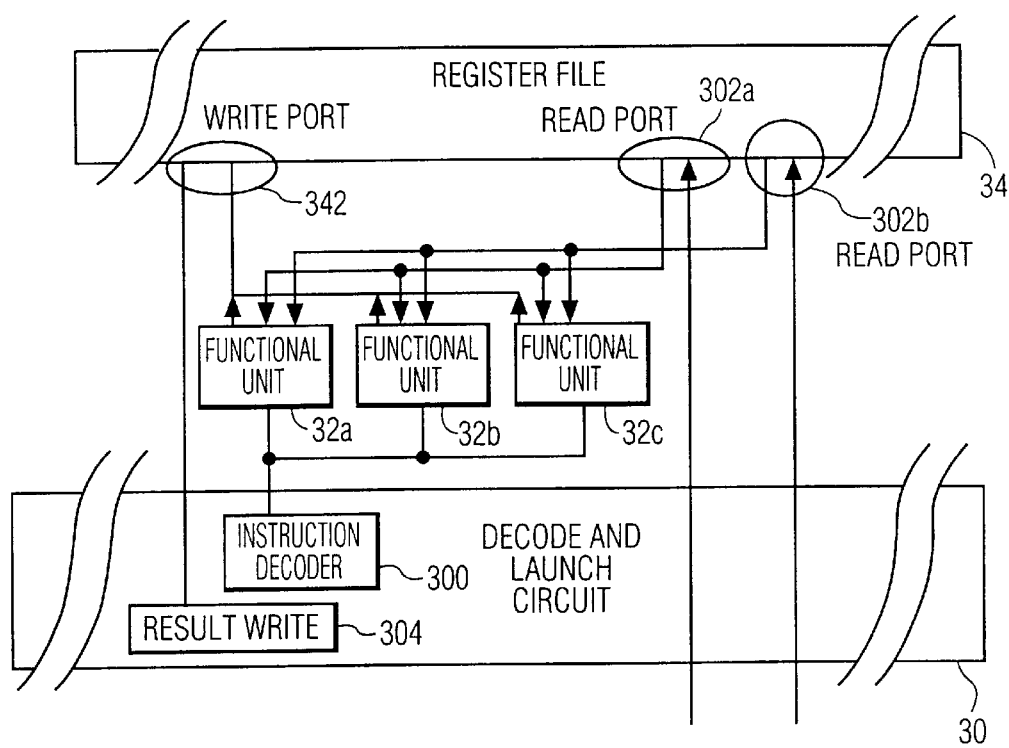
FIG. 3 is a block diagram of a decode circuit for an issue slot.

FIG. 1 is a diagram of a VLIW processor. The VLIW processor comprises an instruction word memory system 10, a program counter 11, a decode and launch circuit 12, functional units 14a–k and a multi-port register file 16. Counter 11 is coupled to an address input of memory system 10. Memory system 10 has an instruction issue register (not shown) partitioned in issue slots (also called instruction bus). An issue slot has a number of functionally parallel paths for routing individual bits of the instruction word currently buffered in the issue register. An output of the issue register is coupled to decode and launch circuit 12. Outputs of circuit 12 are coupled to functional units 14a–k and to multiport register file 16. Read ports and write ports of register file 16 are coupled to functional units 14a–k. Memory system 10 supplies instruction words consecutively to decode and launch circuit 12 under control of counter 11. Preferably, system 10 uses instruction caching and/or prefetching but this is not essential to the invention. System 10 may also perform decompress operations on instruction words stored in a compressed format before outputting them. Decode and launch circuit 12 receives the instruction words. Circuit 12 treats the functionally parallel paths from memory system 10 as a collection of fields, each field being associated with one or more of the paths. A collection of fields makes up a command. A collection of commands forms a single instruction word.

FIG. 2a shows an instruction word in the first format, wherein the word is divided into a number of slots 20a–e. Each respective one of slots 20a–e corresponds to a respective command. Each slot has a field for an opcode 22a–e, two fields for operands 24a–e, 26a–e (expressing a reference to a relevant register in register file 16), and one field for a target for a result 28a–e (expressing a reference to a relevant register in register file 16).

FIGS. 2b,c show instruction words in a second format wherein multiple slots have been combined into "superslots". For example, superslot 29a combines the fields of conventional slots 20a and 20b, and superslot 29b combines the fields of slots 20c–e. The superslot format enables implementing commands that use more operands than can be implemented with a single conventional slot. Generally, each individual field 22a–e, 24a–e, 26a–e, 28a–e has either the same function in superslots 29a and 29b as in a conventional slot 20a–e or no function at all. For example, a specific one of fields 24a–e and 26a–e define an operand in the first format as well as in the second format, or it is not used at all. A specific one of fields 22a–e is used for an opcode in the first format as well as in the second format, or it is not used at all. A specific one of fields 28a–e is used for a target in the first format as well as in the second format or it is not used at all. Alternatively, fields 22a–e, 24a–e, 26a–e, and 28a–e in the second format have purposes different from those in the first format FIG. 3 is a diagram of the VLIW processor, with part of decode and launch circuit 30, functional units 32a–c, and part of multiport register file 34. The part of decode and launch circuits 30 comprises an instruction decoder 300 coupled to functional units 32a–c. Units 32a–c are coupled to read ports 302a, 302b of the register file 34. A result write unit 304 is coupled to a write port 342 of register file 34. The outputs of read ports 302a,b are coupled to inputs of functional units 32a–c. Outputs of functional units 32a–c are coupled to write port 342. Decode and launch circuit 12 contains circuits like those of FIG. 3 for each issue slot. Decode and launch circuit 12 processes information from fields 22a–e, 24a–e, 26a–e, 28a–e according to the function of each field. Each of operand fields 24a–e, 26a–e is associated with a respective read port of register file 16. Decode and launch circuit 12 uses the content of fields 24a–e, 26a–e to address the associated read port. Similarly, target fields 28a–e correspond to write ports of register file 16. Decode and launch circuit 12 uses the content of fields 28a–e to address the associated write port. Each of opcode fields 22a–e is supplied to a respective instruction decoder 300 in decode and launch circuit 12, whereupon the decoded opcodes are supplied to selected ones of functional units 14a–k. Typically, decode and launch circuit 12 uses pipelined operation, for example by initiating operand fetching during decoding of the instruction word. Decoding and fetching of a command from an instruction word is being performed while a command from a previous instruction word is still being executed, and while a result of an command from an even earlier instruction word is being written to its target location. Because the functions of fields 22a–e, 24a–e, 26a–e, and 28a–e are predefined and independent of the format, operand fetching can start before instruction decoding has been completed.

Multiple functional units 14a–k are organized in groups such as in the group in FIG. 3. Each group is associated with a respective issue slot in an instruction word of the first format. When decode and launch circuit 12 detects an instruction word of the first format, circuit 12 determines for each slot which of the units of the group associated with that slot, if any, should execute the command in the slot. That functional unit subsequently receives control signals to execute the command. Thus, decode and launch circuit 12 will cause the functional units in a group to start executing one at a time. Typically, functional units of the same type are present in different groups. For example, each group comprises an ALU (Arithmetic Logic Unit). This prevents bottlenecks caused by using no more than one functional unit of each group at a time.

Some of functional units 14a–c do not belong to one group only. These units are referred to as super functional units below. Each of super units 14a–c is associated with two or more specific groups. This means that each of super units 14a–c can use operands from the read ports to register file 16 that are associated with these specific groups. Also, super units 14a–c can use the write ports to register file 16 that are associated with these specific groups. Commands for super functional units 14a–c come from instruction words in the second format. Such commands are located in superslots 29a and 29b. Operand fields 24a,b and 26a,b in the superslot serve for fetching operands from register file 16 for super units 14a–c. Each of fields 24a,b and 26a,b is associated with the same read port for all instruction words, regardless of the instruction word's format. As a result, fetching can start before the format is determined. Similarly, target fields 28a,b serve to control the write ports to register file 16. Each of these fields is associated with the same write port for all instruction words, independent of the format. When decode and launch circuit 12 causes a particular super unit to start executing a command, circuit 12 will prevent any of the functional units 14d–k from starting to execute a command in the groups associated with that super unit. Decoded opcode fields 22a,b in superslots 29a,b correspond to opcode fields 22a,b in the conventional slots 20a,b associated with those groups, and are used to control only the relevant super unit 14a–c. One may use, for example, only the opcode of one of these slots to control the super unit, but one may also use a combine circuit to combine opcodes of two or more of those slots. Thus, a larger number of different operations can be defined for each of super units 14a–c. Super units 14a–c execute commands for implementing operations which require more than two operands and/or produce more than two results. Examples of such operations are:

AV (R1,R2,R3 . . . ) Producing the average of three or more operands R1,R2,R3 . . . ;

ME (R1,R2,R3 . . . ) Producing the median of three, five or more operands R1,R2,R3 . . . ;

SO (R1,R2) Sorting two operands R1 and R2, the bigger operand being placed in a result register and the smaller in another result register;

TP (R1,R2,R3,R4 . . . ) Transposition of matrix with rows R1,R2,R3,R4;

RT (R1,R2,R3) Rotation of a vector with components R1,R2,R3 over a specified angle.

In a conventional VLIW processor, above operations require execution of several commands in sequence. The registers in the multiport register file are used in some cases to represent a combination of a set of small numbers. For example, if the registers are 64-bit wide, four 16-bit numbers could be represented per register. In this case, each of these numbers may be operated upon separately. For example, in response to an ADD command a functional unit may add four pairs of numbers from two registers.

This approach can be used for super units as well. For example, four registers can represent a 4×4 matrix of 16-bit numbers. Each register contains a respective quadruplet: R1=(a11, a12, a13, a14), R2=(a21, a22, a23, a24), R3=(a31, a32, a33, a34), R4=(a41, a42, a43, a44), representing a respective one of the rows of the matrix. A set of components stored in different registers but in the same position of the corresponding quadruplet represents a column of the matrix. In a transposition operation, the components of different rows but in the same position are placed together in a register RESULT1=(a11, a21, a31, a41), and RESULT2= (a12, a22, a32, a42). A super unit for transposing matrices could use two issue slots and generate two rows of a 4×4 matrix. By providing two commands for such a functional unit, one for producing the two top rows of the transposed matrix and one for providing the two bottom rows, transposition is obtained very quickly.

A similar operation is a shuffle operation:

SH R1,R2,R3→R4 (,R5)

This operation permutes and/or selects numbers stored in registers R1 and R2 according to permutation defined in register R3 and causes the number to be stored in permuted order in register R4 and optionally in register R5.

In some cases, one or more operands have standard values. In these cases it is advantageous to define an additional command, which fits in a single issue slot. In this additional command, the opcode defines the particular operation and the standard value of one or more of the operands. The standard value may be defined implicitly. The additional command contains operand references only to the remaining operands. Such a command can be used in a single issue slot of an instruction word having either the first or the second format. When decode and launch circuit 12 encounters such an instruction it supplies the standard arguments to the super unit itself. Thus, the super unit can receive a command both using one issue slot and using two or more issue slots. In the former case, the standard values are used and a greater number of commands can be included in the instruction word.

In the embodiment of FIG. 1, each super unit uses all fields of the issue slots associated with an integer number of groups of functional units. An alternative super unit may use some, but not all, of the fields of the issue slots. For example, such an alternative unit may process three operands, two of which stem from the fields of one particular issue slot and a third one of which comes from another issue slot. When such an alternative unit is used, the other fields of the relevant issue slots can be made available for other units that can start executing in parallel with the alternative super unit. These other functional units may have, for example, only one operand or no operand at all, or may produce no result. These other units would use only some of the fields that the alternative unit leaves unused. Also, these other functional units might be alternative super functional units themselves, using some fields of the issue slot in addition to fields of another issue slot. However, the use of alternative functional units imposes complex restrictions on the combinations of units that can receive commands from a single instruction word. By using all fields of the issue slots, or at least by not using remaining fields in partly assigned slots, such constraints are avoided. This enables utilizing a higher degree of parallelism and it makes compilation of the instruction words much easier.

Figure 4:
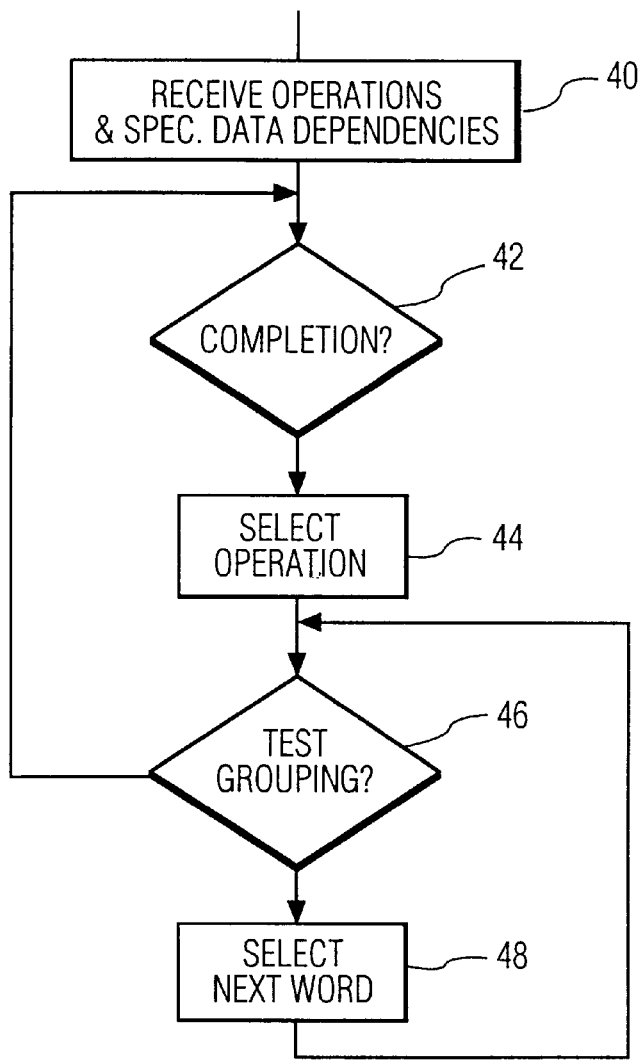
FIG. 4 is a flow diagram for compiling a program.

A compiler generates the instruction words for the VLIW processor. The compiler describes a program in terms of a number of commands with data dependencies between the commands. The compiler searches for a way of placing all commands in a set of instruction words. The compiler performs a minimization of the number of instruction words that need to be executed sequentially during execution of the program. FIG. 4 is a diagram of flow chart for a method of compiling programs. In a first step 40, a set of operations is received together with a specification of data dependencies between operations. Subsequently, the compiler starts searching for a way of placing commands for the operations in a set of instruction words. Second step 42 tests whether commands have been placed for all the operations received. If so, the compilation process is completed. If not, third step 44 selects an operation for which no command has yet been placed and for which preceding "source operations", which produce its operands, have already been placed. Furthermore, the earliest instruction word is selected from the set of instruction words after the instruction words in which commands for the source operations have been placed. Fourth step 46 tests whether it is possible to construct an instruction word which contains the commands already included in that earliest instruction word plus a command for the selected operation. Step 46 takes into account the nature of the commands and the grouping of the functional units. It is tested whether it is possible to both place the commands in different groups; and place commands for super functional units so that no other commands use issue slots for the groups associated with those super functional units.

If this is possible, the selected instruction word is updated and the method returns to second step 42. If this is not possible, a fifth step 48 is executed in which an instruction word subsequent to the selected instruction word is selected and fourth step 46 is repeated.

Figure 5:
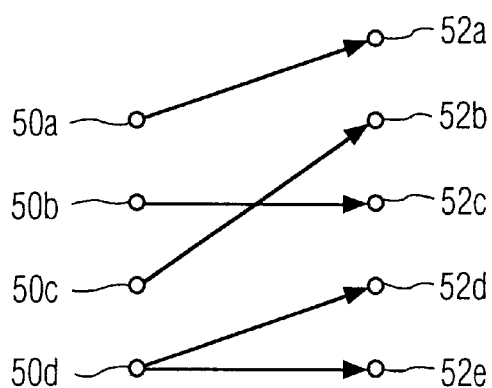
FIG. 5 an assignment of commands to instruction slots.

FIG. 5 is a diagram to explain fourth step 46 further. On the left, a number of operations is shown as first nodes 50a–d. On the right, a number of issue slots is shown as second nodes 52*a–e*. The task of the fourth step is to test whether there is a mapping of the first nodes 50*a–d*, to the second nodes 52*a–e*. In this mapping an operation for a super functional unit 50*d* maps to two or more issue slots 52*d,e*. The other first nodes 50*a–d* correspond to conventional operations and each maps to a single respective one of second nodes 52*a–e*. Each of nodes 52*a–e* corresponds to an issue slot associated with a group that contains a functional unit capable of executing the relevant operation. Of course, the flow chart of FIG. 4 is but a simplified example. In general, minimization is performed under constraints of data dependencies between commands (i.e., if a first command uses as input a result from a second command, these commands should be placed in different instruction words, the instruction word that contains the first command following the instruction word that contains the second command). Moreover, the minimization is performed under the constraint that the functional units are capable of starting execution of all commands in parallel for each instruction word.

We claim:

1. A method of compiling instructions for a VLIW processor, the processor containing multiple groups of functional units, each particular one of the functional units being associated with a single one of the groups, and also comprising at least one super functional unit associated with at least two of the groups, each very long instruction word being allowed to contain at most one specific command for each specific one of the groups, each very long instruction word which contains a command for the super functional unit not having any commands for any of the functional units in said at least two of the groups, the method comprising:

receiving a set of commands that are to be executed by the functional units;

searching for consistent assignments of the commands to the very long instruction words, and, upon finding a first one of the commands for the super functional unit and at least a second one of the commands for any one of the functional units from said at least two of the groups, assigning the first command and the second command to different ones of the very long instruction words.

2. A machine readable medium comprising a program for executing a method of compiling instructions for a VLIW processor, each instruction comprising a very long instruction word, the processor containing multiple groups of functional units, each particular one of the functional units being associated with a single one of the groups, and at least one super functional unit associated with at least two of said groups, each very long instruction word being allowed to contain at most one specific command for each specific one of the groups, each very long instruction word which contains a command for the super functional unit not being allowed to contain commands for any of the functional units in said at least two of the groups, the method comprising:

receiving a set of commands that are to be executed by the functional units;

searching for consistent assignments of the commands to the very long instruction words, and, upon finding a first one of the commands for the super functional unit and at least a second one of the commands for any one of the functional units from said at least two of the groups, assigning the first command and the second command to different ones of the very long instruction words.

\* \* \* \* \*